(12) United States Patent
Chen et al.

(10) Patent No.: US 9,315,621 B2
(45) Date of Patent: Apr. 19, 2016

(54) POLYMERIC SURFACTANT

(75) Inventors: Xin Chen, Hockessin, DE (US); John Mark Chandler, Bear, DE (US)

(73) Assignee: CRODA, INC., Edison, NJ (US)

( * ) Notice: Subject to any disclaimer, the term of this patent is extended or adjusted under 35 U.S.C. 154(b) by 0 days.

(21) Appl. No.: 13/634,652

(22) PCT Filed: Mar. 16, 2011

(86) PCT No.: PCT/US2011/028601
§ 371 (c)(1),
(2), (4) Date: Dec. 5, 2012

(87) PCT Pub. No.: WO2011/116049
PCT Pub. Date: Sep. 22, 2011

(65) Prior Publication Data
US 2013/0079536 A1    Mar. 28, 2013

Related U.S. Application Data

(60) Provisional application No. 61/282,689, filed on Mar. 17, 2010.

(51) Int. Cl.
| | | |
|---|---|---|
| C07C 59/00 | (2006.01) | |
| C08G 65/08 | (2006.01) | |
| C08G 65/26 | (2006.01) | |
| C08G 65/332 | (2006.01) | |
| C11D 1/66 | (2006.01) | |
| B01F 17/00 | (2006.01) | |

(52) U.S. Cl.
CPC ............ *C08G 65/08* (2013.01); *B01F 17/0028* (2013.01); *C08G 65/2606* (2013.01); *C08G 65/3322* (2013.01); *C11D 1/667* (2013.01); *C08G 2650/24* (2013.01)

(58) Field of Classification Search
CPC ...... C07C 59/42; C07C 59/68; C07C 69/587; C07C 69/732; C10N 2240/08
USPC ........................................................ 554/213
See application file for complete search history.

(56) References Cited

U.S. PATENT DOCUMENTS

| 4,153,770 | A | 5/1979 | Ogata et al. | |
|---|---|---|---|---|
| 4,687,843 | A | 8/1987 | Smolin et al. | |
| 2003/0153787 | A1 | 8/2003 | Carpenter et al. | |
| 2003/0235598 | A1 | 12/2003 | Klug et al. | |
| 2007/0299228 | A1* | 12/2007 | McNamee et al. | 526/238.23 |
| 2008/0090746 | A1* | 4/2008 | Penninger | 510/361 |

FOREIGN PATENT DOCUMENTS

| DE | 102005026522 | 12/2006 |
|---|---|---|
| EP | 0000424 | 1/1979 |
| EP | 1344518 | 9/2003 |
| EP | 1367118 | 12/2003 |
| JP | 54-18898 | 2/1979 |
| JP | 06-340598 | 12/1994 |
| JP | 11-12125 | 1/1999 |
| JP | 2000-210504 | 8/2000 |
| JP | 2005-41819 | 2/2005 |
| WO | WO 98/55088 | 12/1998 |
| WO | WO 03/033634 | 4/2003 |

OTHER PUBLICATIONS

Chengfei Lu et al., "Micellization and gelation of aqueous solutions of star-shaped PEG-PCL block copolymers consisting of branched 4-arm poly(ethylene glycol) and polycaprolactone blocks", European Polymer Journal, vol. 43, pp. 1857-1865, published on Mar. 3, 2007.*
Chengfei Lu et al., "Aggregation behavior of linear and star-type amphiphilic poly(ethylene glycol)-polycaprolactone block copolymers", Journal of East China University of Science and Technology (Natural Science Edition), vol. 32, No. 6, pp. 655-660, published on Jun. 30, 2006.*
International Search Report dated May 19, 2011 for PCT/US2011/028601.
Examination Report dated Mar. 3, 2105, with English translation, issued in corresponding Japanese Application No. 2013-500168.
Lu, Chengfei, et al., "*Micellization and gelation of aqueous solutions of star-shaped PEG-PCL block copolymers consisting of branched 4-arm poly(ethylene glycol) and polycaprolactone blocks*," European Polymer Journal, 43 (2007) 1857-1865.
Lu, Chengfei, et al., "*Aggregation behavior of linear and star-type amphiphilic poly(ethylene glycol)polycaprolactone block copolymers*," Journal of East China University of Science and Technology (Natural Science Edition), vol. 32, No. 6 (Jun. 30, 2006) pp. 655-660 (English translation of Abstract provided).
Official Action in corresponding Chinese Patent Application No. 201180014433.7, dated Mar. 3, 2015 (English translation provided).
European Supplementary Search Report dated Sep. 22, 2015 for corresponding EP 11756898.
"Polyethylene Glycols and Polyol Esters" Croda Europe Ltd. website, Jan. 2009 (XP055213903).

* cited by examiner

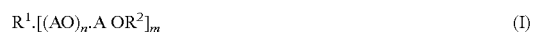

Primary Examiner — Deborah D Carr
(74) Attorney, Agent, or Firm — Jones Day

(57) ABSTRACT

A compound of the formula $$R^1\text{-}[(AO)_n\text{-}A\ OR^2]_m \qquad (I)$$

where: $R^1$ is the residue of a group having at least m active hydrogen atoms where m is at least 2; AO is an alkylene oxide residue; each n is independently from 0 to 100; and each $R^2$ is independently H or an acyl group $COR^3$ where each $R^3$ is independently a residue of a polyhydroxyalkyl or polyhydroxyalkenyl carboxylic acid, a residue of a hydroxyalkyl or hydroxyalkenyl carboxylic acid and/or a residue of an oligomer of the hydroxyalkyl or hydroxyalkenyl carboxylic acid wherein on average at least 2 of $R^2$ is an acyl group. The compounds are particularly suitable for use as emulsifiers and/or dispersants.

19 Claims, No Drawings

US 9,315,621 B2

POLYMERIC SURFACTANT

CROSS REFERENCE TO RELATED APPLICATION

This application is the National Phase application of International Application No. PCT/US2011/028601, filed Mar. 16, 2011, which designates the United States and was published in English, and further claims the benefit of priority from U.S. Provisional Application No. 61/282,689, filed Mar. 17, 2010. The foregoing related applications, in their entirety, is hereby incorporated by reference.

FIELD OF THE INVENTION

This invention relates to new liquid polymeric surfactants derived from star shaped polymers and their use as emulsifiers and/or dispersants.

BACKGROUND OF THE INVENTION

Polymeric surfactants are known for use in stabilising oil water interfaces, particularly in water-in-oil emulsions, oil-in water emulsions and dispersions. Such surfactants include A-B-A block co-polymeric surfactants in which the A blocks are polyester blocks, particularly polyesters of hydroxyl aliphatic acid for example of hydroxystearic acid to give polyhydroxy stearate (PHS) blocks, and the B block is a polyalkylene glycol block, especially a polyethylene glycol (PEG) block. Such polymeric block surfactants are described in EP 0000424 A and their use in stabilising the emulsion used in inverse emulsion acrylamide polymerisation in GB 2157744 and U.S. Pat. No. 4,776,966. The molecules of these surfactants have a shape that makes them particularly useful in stabilising water-in-oil dispersions and emulsions. It is believed that, at the oil/water interface, the molecule sits with the hydrophilic PEG block in the water phase and the two hydrophobic PHS blocks in the oil phase. This arrangement gives good packing at the interface and is believed to contribute to the effectiveness of these materials. These surfactants have been used in industrial applications. More recently these surfactants have been used in personal care applications to stabilise water-in-oil dispersions and emulsions when the manufacturing process was changed so that xylene was not used as a solvent. The possible presence of residual xylene in the final product surfactant had previously precluded the use of the surfactants in skin contact applications. For example WO 98/55088 describes a personal care composition which is or includes a hydrophile-in-oil emulsion or dispersion which includes as a dispersant and/or emulsifying agent a block copolymeric surfactant of the formula A-B-A.

For many of the above industrial and personal care applications the molecular weight of the PEG block needs to be higher than 1000. In such cases the polymeric surfactant is typically a waxy solid. Whilst the waxy solid is a very effective emulsifier and/or dispersant, liquid polymeric surfactants having the same properties would be more desirable. Such liquid polymeric surfactants would be easier to handle and process. Cold processing is advantageous for volatile and/or heat sensitive ingredients in personal care formulations, for example perfumes. Furthermore cold processing is easier to undertake, more economical and energy efficient.

Typically the A block of the A-B-A polymeric surfactant is the residue of PHS which has been chain terminated with stearic acid. We have now surprisingly discovered new polymeric surfactants derived from star polymers which are liquid and are effective emulsifiers and/or dispersants.

DETAILED DESCRIPTION OF THE INVENTION

The invention accordingly provides a compound of the formula (I):

$$R^1.[(AO)_n\text{-}A\text{-}OR^2]_m \qquad (I)$$

where:
$R^1$ is the residue of a group having at least m active hydrogen atoms where m is at least 2;
AO is an alkylene oxide residue;
each n is independently from 0 to 100; and
each $R^2$ is independently H or an acyl group $COR^3$ where each $R^3$ is independently a residue of a polyhydroxyalkyl or polyhydroxyalkenyl carboxylic acid, a residue of a hydroxyalkyl or hydroxyalkenyl carboxylic acid and/or a residue of an oligomer of the hydroxyalkyl or hydroxyalkenyl carboxylic acid wherein on average at least 2 of $R^2$ is an acyl group.

The present invention also provides a method of forming a compound of formula (I) as defined herein which comprises reacting a polyhydroxyalkylacid and/or a hydroxyalkylacid with an alkoxylated $R^1$ group.

The compounds of the present invention are at least notionally built up from the group $R^1$ that can be considered as the "core group" of the compounds. This core group is the residue (after removal of m active hydrogen atoms) of a compound containing at least m active hydrogen atoms, preferably present in hydroxyl and/or amino groups, and more preferably present in hydroxyl groups only. Preferably the core group is the residue of a substituted hydrocarbyl group, particularly a $C_3$ to $C_{30}$ substituted hydrocarbyl compound.

Examples of $R^1$ core groups include the residues of the following compounds after removal of m active hydrogen atoms:

1) glycerol and the polyglycerols, especially diglycerol and triglycerol, the partial esters thereof, or any triglycerides containing multiple hydroxyl groups, for example castor oil;
2) tri- and higher polymethylol alkanes such as trimethylol ethane, trimethylol propane and pentaerythritol, and the partial esters thereof;
3) sugars, particularly non-reducing sugars such as sorbitol, mannitol, and lactitol, etherified derivatives of sugars such as sorbitan (the cyclic dehydro-ethers of sorbitol), partial alkyl acetals of sugars such as methyl glucose and alkyl (poly-)saccharides, and other oligo-/polymers of sugars such as dextrins, partially esterified derivatives of sugars, such as fatty acid esters, for example of lauric, palmitic, oleic, stearic and behenic acid, esters of sorbitan, sorbitol, and sucrose, aminosaccharides such as N-alkylglucamines and their respective N-alkyl-N-alkenoyl glucamides;
4) polyhydroxy carboxylic acids especially citric and tartaric acids;
5) amines including di- and poly-functional amines, particularly alkylamines including alkyl diamines such as ethylene diamine (1,2-diaminoethane);
6) amino-alcohols, particularly the ethanolamines, 2-aminoethanol, di-ethanolamine and triethanolamine;
7) carboxylic acid amides such as urea, malonamide and succinamide; and
8) amido carboxylic acids such as succinamic acid.

Preferred $R^1$ core groups are residues of groups having at least three, more preferably in the range from 4 to 10, particularly 5 to 8, and especially 6 free hydroxyl and/or amino groups. The $R^1$ group preferably has a linear $C_4$ to $C_7$, more preferably $C_6$ chain. The hydroxyl or amino groups are preferably directly bonded to the chain carbon atoms. Hydroxyl groups are preferred. $R^1$ is preferably the residue of an open chain tetratol, pentitol, hexitol or heptitol group or an anhydro e.g. cycloether anhydro, derivative of such a group. In a particularly preferred embodiment, $R^1$ is the residue of, or a residue derived from, a sugar, more preferably a monosaccharide such as glucose, fructose or sorbitol, a disaccharide such as maltose, palitose, lactitol or lactose or a higher oligosaccharide. $R^1$ is preferably the residue of a monosaccharide, more preferably of glucose, fructose or sorbitol, and particularly of sorbitol.

The open chain form of $R^1$ groups is preferred, however groups including internal cyclic ether functionality can be used, and may be obtained inadvertently if the synthetic route exposes the group to relatively high temperatures or other conditions, which promote such cyclisation.

The index m is a measure of the functionality of the $R^1$ core group and the alkoxylation reactions will replace some or all of the active hydrogen atoms (dependant on the molar ratio of core group to alkoxylation group) in the molecule from which the core group is derived Reaction at a particular site may be restricted or prevented by steric hindrance or suitable protection. The terminating hydroxyl groups of the polyalkylene oxide chains in the resulting compounds are then available for reaction with the above defined acyl compounds. The index m will preferably be at least 3, more preferably in the range from 4 to 10, particularly 5 to 8, and especially 5 to 6. Mixtures may be, and normally are, employed, and therefore m can be an average value and may be non-integral.

The groups $R^2$ are the "terminating groups" of the (poly) alkylene oxide chains. The terminating groups are hydrogen or an acyl group $COR^3$ where each $R^3$ is independently a residue of a polyhydroxyalkyl or polyhydroxyalkenyl carboxylic acid, a residue of a hydroxyalkyl carboxylic acid or hydroxyalkenyl carboxylic acid and/or a residue of an oligomer of the hydroxyalkyl or hydroxyalkenyl carboxylic acid.

The hydroxylalkyl and hydroxyalkenyl carboxylic acids are of formula HO—X—COOH where X is a divalent saturated or unsaturated, preferably saturated, aliphatic radical containing at least 8 carbon atoms and no more than 20 carbon atoms, typically from 11 to 17 carbons and in which there are at least 4 carbon atoms directly between the hydroxyl and carboxylic acid groups.

Desirably the hydroxyalkyl carboxylic acid is 12-hydroxystearic acid. In practice such hydroxyalkyl carboxylic acids are commercially available as mixtures of the hydroxyl acid and the corresponding unsubstituted fatty acid. For example 12-hydroxystearic acid is typically manufactured by hydrogenation of castor oil fatty acids including the C18 unsaturated hydroxyl acid and the non-substituted fatty acids (oleic and linoleic acids) which on hydrogenation gives a mixture of 12-hydroxystearic and stearic acids. Commercially available 12-hydroxystearic acid typically contains about 5 to 8% unsubstituted stearic acid.

The polyhydroxyalkyl or polyhydroxyalkenyl carboxylic acid is manufactured by polymerising the above hydroxyalkyl or hydroxyalkenyl carboxylic acid. The presence of the corresponding unsubstituted fatty acid acts as a terminating agent and therefore limits the chain length of the polymer. Desirably the number of hydroxyalkyl or hydroxyalkenyl units is on average from 2 to 10, particularly from about 4 to 8 and especially about 7 The molecular weight of the polyacid is typically from 600 to 3000, particularly from 900 to 2700, more particularly from 1500 to 2400 and especially about 2100.

The residual acid value for the polyhydroxyalkyl or polyhydroxyalkenyl carboxylic acid typically is less than 50 mgKOH/g and a preferable range is 30 to 35 mgKOH/g. Typically the hydroxyl value for the polyhydroxyalkyl or polyhydroxyalkenyl carboxylic acid is a maximum of 40 mgKOH/g and a preferable range is 20 to 30 mgKOH/g.

The oligomer of the hydroxyalkyl or hydroxyalkenyl carboxylic acid differs from the polymer in that termination is not by the unsubstituted corresponding fatty acid. Desirably it is a dimer of the hydroxylalkyl or hydroxyalkenyl carboxylic acid.

The alkylene oxide groups AO are typically groups of the formula: $-(C_rH_{2r}O)-$ where r is 2, 3 or 4, preferably 2 or 3, i.e. an ethyleneoxy ($-C_2H_4O-$) or propyleneoxy ($-C_3H_6O-$) group, and it may represent different groups along the alkylene oxide chain. Generally, it is desirable that the chain is a homopolymeric ethylene oxide chain. However, the chain may be a homopolymer chain of propylene glycol residues or a block or random copolymer chain containing both ethylene glycol and propylene glycol residues. Usually, where co-polymeric chains of ethylene and propylene oxide units are used the molar proportion of ethylene oxide units used will be at least 50% and more usually at least 70%.

The number of alkylene oxide residues in the (poly)alkylene oxide chains, i.e. the value of the each parameter n, will preferably be in the range from 2 to 50, more preferably 3 to 20, and particularly 5 to 10. The total of the indices n (i.e. n×m) is preferably in the range from 10 to 300, more preferably 20 to 100, particularly 25 to 70, and especially 30 to 50. The value of the index n is an average value, which includes statistical variation in the chain length.

Where the number of acyl residues in the molecule is significantly less than m, the distribution of such groups may depend on the nature of the core group and on the extent and effect of the alkoxylation of the core group. Thus, where the core group is derived from pentaerythritol, alkoxylation of the core residue may be evenly distributed over the four available sites from which an active hydrogen can be removed and on esterification of the terminal hydroxyl functions the distribution of acyl groups will be close to the expected random distribution. However, where the core group is derived from compounds, such as sorbitol, where the active hydrogen atoms are not equivalent, alkoxylation will typically give unequal chain lengths for the polyalkyleneoxy chains. This may result in some chains being so short that the other (longer) chains exert significant steric effects making esterification at the "short chain" terminal hydroxyl groups relatively difficult. Esterification then will generally preferentially take place at the "long chain" terminal hydroxyl groups.

The compounds of the invention can be made by firstly alkoxylating $R^1$ core groups containing m active hydrogen atoms, by techniques well known in the art, for example by reacting with the required amounts of alkylene oxide, for example ethylene oxide and/or propylene oxide. Some suitable alkoxylated products are commercially available, for example sorbitol 30 ethoxylate (Atlas™ G-2330), sorbitol 40 ethoxylate (Atlas™ G-2004), sorbitol 50ethoxylate (Atlas™ G-2005), and trimethylolpropane 40 ethoxylate 10 propoxylate (Emkarox™ VG-305W). All are available ex Croda. Other alkoxylation products include sorbitol 12 ethoxylate and sorbitol 100 ethoxylate.

The second stage of the process preferably comprises reacting the aforementioned alkoxylated species with a polyhydroxyalkyl (alkenyl) carboxylic acid and/or a hydroxyalkyl (alkenyl) carboxylic acid under standard catalysed esterification conditions at temperatures up to 250° C.

The invention accordingly includes a process for the manufacture of compound (I) described herein which process involves reacting the group R1 with alkylene oxide and then esterifying the alkoxylated product of this reaction with a polyhydroxyalkyl (alkenyl) carboxylic acid and/or a hydroxyalkyl(alkenyl) carboxylic acid.

The molar ratio of alkoxylated product to a polyhydroxyalkyl (alkenyl) carboxylic acid and/or a hydroxyalkyl(alkenyl) carboxylic acid preferably ranges from 1:2 to 1:40.

Compound (I) is a liquid with a molecular weight ranging from 3000 to 8000. Compound (I) is preferably a star block copolymer.

One of the key benefits of compound (I) is that it can have a wide range of HLB depending on whether the $R^3$ group is a residue of a polyhydroxyalkylcarboxylic acid, a hydroxyl alkylcarboxylic acid, an oligomer of a hydroxyalkyl carboxylic acid or a mixture thereof and also depending on the ratio of each of these ingredients. The typical range of HLB is from 1.3 to 15.0. Therefore compound (I) can have a wide range of surfactant properties, for example, water in oil emulsifier, wetting agent, oil in water emulsifier, detergent, solubiliser.

Accordingly, the present invention is also directed to the use of compound (I) described herein as a water in oil emulsifier, wetting agent, oil in water emulsifier, detergent, dispersant and/or solubiliser.

In one preferred embodiment of the invention, compound (I) is prepared by reaction of the alkoxylated core group $R^1$ with a hydroxyl alkylcarboxylic acid in a molar ratio of from 1:14 to 1:19. Preferably compound (I) prepared by this route has an HLB of between 6 and 9 and a molecular weight between 6500 and 8000.

In a further preferred embodiment of the invention, compound (I) is prepared by reaction of the alkoxylated core group $R^1$ with a mixture of a polyhydroxyalkyl carboxylic acid and a hydroxyl alkylcarboxylic acid where the molar ratio of alkoxylated core group to mixture of acids preferably ranges from 1:1 to 1:6. Preferably compound (I) prepared by this route has an HLB of between 12 and 15 and a molecular weight between 3000 and 4000.

In a further preferred embodiment of the invention, compound (I) is prepared by reaction of the alkoxylated core group $R^1$ with a polyhydroxyalkyl carboxylic acid where the molar ratio of alkoxylated core group to acid preferably ranges from 1:14 to 1:19. Preferably compound (I) prepared by this route has an HLB of between 6 and 9 and a molecular weight between 6500 and 8000.

Surfactants such as Compound (I) used in water based systems are generally water soluble, having an HLB greater than 7. Such materials can be used as oil in water emulsifiers, particularly in personal care applications; as dispersants for pigments; as emulsifiers in emulsion polymerisation; as wetting agents in aqueous systems; as surfactants in domestic detergents, particularly in laundry formulations; in crop protection formulations particularly as adjuvants, dispersants and/or emulsifiers in agrochemical formulations; and other applications.

The properties of the surfactants of this invention also make them suitable as emulsifiers particularly in oil in water emulsions e.g. in personal care applications. Personal care emulsion products can take the form of creams and milks desirably and typically include emulsifier to aid formation and stability of the emulsion. Typically, personal care emulsion products use emulsifiers (including emulsion stabilisers) in amounts of about 3 to about 5% by weight of the emulsion.

The oil phase of such emulsions are typically emollient oils of the type used in personal care or cosmetic products, which are oily materials which is liquid at ambient temperature or solid at ambient temperature, in bulk usually being a waxy solid, provided it is liquid at an elevated temperature, typically up to 100° C. more usually about 80° C., so such solid emollients desirably have melting temperatures less than 100° C., and usually less than 70° C., at which it can be included in and emulsified in the composition.

The concentration of the oil phase may vary widely and the amount of oil is typically from 1 to 90%, usually 3 to 60%, more usually 5 to 40%, particularly 8 to 20%, and especially 10 to 15% by weight of the total emulsion. The amount of water (or polyol, e.g. glycerin) present in the emulsion is typically greater than 5%, usually from 30 to 90%, more usually 50 to 90%, particularly 70 to 85%, and especially 75 to 80% by weight of the total composition. The amount of surfactant used on such emulsions is typically from 0.1 to 10%, more usually 0.5 to 8%, more desirably 1 to 7%, particularly 1.5 to 6%, and especially 2 to 5.5%, by weight of the emulsion.

The end uses formulations of such emulsions include moisturizers, sunscreens, after sun products, body butters, gel creams, high perfume containing products, perfume creams, baby care products, hair conditioners, skin toning and skin whitening products, water-free products, anti-perspirant and deodorant products, tanning products, cleansers, 2-in-1 foaming emulsions, multiple emulsions, preservative free products, emulsifier free products, mild formulations, scrub formulations e.g. containing solid beads, silicone in water formulations, pigment containing products, sprayable emulsions, colour cosmetics, conditioners, shower products, foaming emulsions, make-up remover, eye make-up remover, and wipes. A preferred formulation type is a sunscreen containing one or more organic sunscreens and/or inorganic sunscreens such as metal oxides, but desirably includes at least one particulate titanium dioxide and/or zinc oxide, The surfactants of this invention can be used as emulsifiers in emulsion polymerisation. Typically emulsion polymerisation is carried out on emulsions of ethylenically unsaturated monomers in water. Suitable monomers include unsaturated carboxylic acids and their alkyl esters, amides, N-substituted amides and nitriles, aromatic vinyl compounds, diene compounds which may be included as monomers or specifically as crosslinking agents, vinylethers, vinylesters, olefines and hydrophobic allyl compounds.

Such emulsion polymerisation methods are particularly applicable to the manufacture of acrylic copolymers, for example those where at least 50%, more usually at least 60%, desirably at least 80% e.g. 90% or more up to 100%, by weight of the monomers are acrylic monomers. The acrylic polymers may be those based on mixed alkyl acrylates, especially where the predominant monomer is methyl methacrylate, and may include anionic units such as (meth)acrylic acid units or cationic units such as amino substituted ethylenically unsaturated monomers.

The amount of surfactant used will depend on the particular monomers and the polymerisation system used, the degree of colloidal stability needed and the desired particle size of the polymer in the product latex. For an otherwise conventional oil in water emulsion polymerisation, to give a latex having a particle size of from 80 to 500 nm the amount of surfactant used will typically be from 0.25 to 5 parts by weight surfactant per 100 parts by weight total monomer (phm). More usually the amount will be from 0.5 to 2.5 phm, particularly from 1 to 2 phm.

In microemulsion polymerisation systems, the concentration of monomer is typically substantially lower than in conventional emulsion or other dispersion polymerisation systems e.g. from 3 to 10% by weight. The proportion of surfactant relative to the amount of monomer is also relatively high because the microemulsion has higher interface area per unit mass of monomer corresponding to the smaller emulsion particle size and typical levels can be from 10 to 150 phm. Overall solids contents of microemulsion systems are usually in the range 15 to 30% by weight of the total emulsion.

The surfactants of this invention can be used as dispersants for solids in aqueous media, particularly for pigments, including inorganic pigments e.g. titanium dioxide, pigmentary iron oxide and organic pigments e.g. phthalocyanine pigments, carbon black, and similar materials. The amount of surfactant used in such dispersant applications depends on the materials employed and the dispersion concentration required, but is usually from 0.2 to 10% by weight of the solid e.g. pigment being dispersed. In aqueous dispersions, for inorganic pigments the amount used is typically from 0.05 to 5%, more usually 0.1 to 2.5%, by weight of the solid dispersed and for organic pigments typically the amount used is from 3 to 10% by weight of the solid dispersed. Typical such dispersions will contain up to about 70%, often up to about 65%, of inorganic pigment and up to about 35% by weight organic pigment, but this may be up to 50% for pigment pastes. When incorporated into end use products such as paints typical pigment levels in the final product will be about 3 to about 30%, particularly about 20 to about 25%, for inorganic pigments, about 1 to about 15% for organic pigments, particularly about 10 to about 12%, especially for phthalocyanine type organic pigments, and about 0.5 to about 5%, particularly about 3 to about 3%, for carbon black. The continuous phase in such dispersions will usually be water based.

The surfactants can also be used as domestic detergents for example in laundry applications and may be used alone or in combination with other, non-ionic, anionic, cationic, amphoteric and/or zwitterionic surfactants. Formulations including surfactants of this invention for laundry use will typically also include further components including one or more of builders e.g. phosphates, particularly sodium tripolyphosphate; organics such as citrate and/or tartrate; and/or zeolites; flow and/or filter aids, commonly used in powder formulations, which may include co-builders such as sodium carbonate and/or bicarbonate, particularly in powders where the builder is a zeolite (though because typical co-builders are alkali, they will not usually be used in hand washing formulations); corrosion inhibitors; anti-redeposition aids such as carboxy methyl cellulose; and optical brighteners. Further components may include perfumes; enzymes, including lipases, proteases, celluloses and/or amylases; bleaches, typically based on sodium perborate, sodium percarbonate or similar materials, which will typically be used with bleach activators such as tetra-acetyl ethylene diamine (TAED); and stabilisers such as phosphonates or ethylene diamine tetra-acetic acid (EDTA) usually as the sodium salt; soaps; foam control agents (often soaps) and fabric conditioners (softeners) such as quaternary ammonium salts and amine oxides which may be coated onto bentonite type clays.

The compounds of the invention can used as surfactants in agrochemical formulations, in particular as adjuvants for example with herbicides, fungicides, insecticides, acaricides and plant growth regulator formulations, dispersants and/or emulsifiers. The amount of surfactant used to disperse agrochemical(s), is typically at a concentration of 1 to 30% based on the formulation and used as adjuvants, a concentration of from 5 to 60% based on concentrate formulations and 1 to 100% in or as components for addition to tankmixes. Other conventional components can be included in such formulations such as oils e.g. mineral oil(s), vegetable oil(s) and alkylated vegetable oil(s); solvents and/or diluents; and other surfactants which may be anionic surfactants, cationic surfactants or non-ionic surfactants. Such other components will, as with formulations using purely conventional surfactants, be used in amounts based on the desired effect.

The surfactants of the invention can also be used in oilfield applications e.g. as foaming agents in foam drilling, as kinetic gas hydrate inhibitors and as water based drilling fluid lubricants.

Foam drilling fluids are water based drilling fluids in which the water phase is foamed, e.g. to minimise formation damage of water sensitive formations. As foaming agents in foam drilling fluids the amount of the surfactant used will typically be from 1 to 3%, more usually from 1 to 2%, by weight of the drilling fluid.

Kinetic gas hydrate inhibitors are materials added to water containing hydrocarbon, particularly C1 to C4 hydrocarbon alkane containing streams to slow down gas hydrate formation or to modify the crystal form of the gas hydrate so as to reduce crystal agglomeration which otherwise would lead to pipe or similar blockage. In gas hydrate inhibition, the surfactants will typically be used at from 0.05 to 5% by weight based on the water phase of the stream being treated.

The surfactant compounds of the invention may be used to provide enhanced lubricity in water based drilling fluids. In use in this application the amount of surfactant used will typically be from 0.05 to 10% by weight of the fluid.

Surfactants used in oil based systems are generally oil soluble and usually water insoluble and in particular having an HLB of less than 7, more usually from 4 to 6. Such materials can be used as emulsifiers and/or stabilisers for water in oil emulsions; or as dispersants for solids in non-aqueous liquids. As such they can be used in a wide variety of applications including in: (water in oil) emulsion polymerisations, particularly to make polyacrylamide (PAM) or related polymers by free radical inverse emulsion polymerisation (i-PAM); emulsion explosives; in water in oil cosmetic emulsions; agrochemical, particularly plant growth regulator, herbicide, and/or pesticide, emulsions dispersions and suspoemulsions; and as emulsifiers and/or dispersants; dispersions of solids, such as pigments and/or inert inorganic metal salts, especially in organic media; oilfield drilling fluid additives, particularly as dispersants and/or emulsifiers for drilling muds and invert emulsion drilling fluids; metal working applications particularly in rolling oil emulsions and cutting fluids.

The surfactants of the invention can be used as emulsifiers in i-PAM polymerisation, in which acrylamide and any co-monomer(s), are dissolved in water, this solution is emulsified in oil, using surfactants as emulsifiers and stabilisers, and the polymerisation initiated. The result is a dispersion of water droplets, containing dissolved PAM, in the oil. Although the viscosity of the aqueous PAM solution is high, the effective viscosity of the emulsion is determined primarily by the oil continuous phase, chosen to be suitably low. In use e.g. in water treatment, the emulsion has to be broken, usually by inverting on dilution into water. The surfactant system must provide adequate emulsion stability before, during and after (for storage) polymerisation, but permit ready breaking of the emulsion during inversion on dilution into water, to facilitate rapid release of the polyacrylamide polymer into the water phase in which it will act. Inversion is commonly promoted by the addition of hydrophilic surfactants after the polymerisation. Relatively oleophilic surfactants of the invention can be used to emulsify and/or stabilise the water in oil emulsion used in this type of polymerisation process.

In i-PAM, the oil phase is typically a mineral oil, particularly a paraffin oil, or an ester oil and the amount of emulsifier surfactant used is typically from 2.5 to 7%, usually from 3 to 4%, by weight of the polymerisation emulsion. The emulsifier system will typically combine a polymeric surfactant, particularly including a surfactant of invention especially of the formula (I), and a low molecular weight low HLB surfactant (relatively less effective as an emulsion stabiliser so that the stabilisation of the emulsion is not so good that inversion is difficult)—the low molecular weight enables it to readily diffuse away from the phase interface during inversion. Commonly the low molecular weight surfactants are fatty acid monoglycerides, fatty acid sorbitan esters or similar surfactants. The relative proportions by weight of polymeric surfactant to low HLB low molecular weight surfactant is typically from 5:95 to 50:50 more usually from 10:90 to 40:60 and commonly about 15:85 to 30:70.

Hydrophobic types of surfactants of this invention can also be used in dispersing solids, particularly pigments such as those described above, in non-aqueous media such as white spirit or aromatic media. In such uses the amount of surfactant used will typically be from 0.5 to 7.5%, more usually from 1 to 5%, by weight of the dispersion.

The compounds of the invention are also useful as emulsifiers or emulsion stabilisers in emulsion explosives in which an oxidiser, typically an aqueous solution of an oxidiser salt usually nitrates, is emulsified in a liquid fuel, typically a hydrocarbon fuel such as mineral and/or paraffin oil, which may also include other petroleum components e.g. microcrystalline wax, paraffin wax, slack wax, and/or petroleum refining distillation residues. The oxidiser solution is usually a saturated or supersaturated aqueous solution, of nitrate salts, particularly $NH_4NO_3$, alkali metal nitrates or alkaline earth metal nitrates, optionally with minor proportions of other salts e.g. $NH_4Cl$ and typically contains 40% to 70% by weight ammonium nitrate and 20% of other nitrates. The internal oxidiser phase is typically at least 75% more usually more than 90% e.g. about 95%, by volume of the emulsion explosive. For use, emulsion explosives typically also include additives to sensitise the compositions to detonation. Commonly this is done by adding materials that provide solid surfaces e.g. solid $NH_4NO_3$, especially as prills, or gas filled voids e.g. by including sodium nitrite, which produces gas by chemical reaction, or glass microspheres, which provide physical voids.

EXAMPLES

The invention is illustrated by the following non-limiting examples.

Example 1

Preparation of Alkoxylated R Group
PEG-50 Sorbitol

In a stainless steel reaction vessel sorbitol 70 (33.09 wt %) was dried to 95% and reacted with ethylene oxide (66.50 wt %) in the presence of potassium hydroxide. The product (27.2 wt %) was then reacted with more ethylene oxide (72.8%) in the presence of potassium hydroxide to yield the PEG-50 sorbitol

Example 2

Preparation of Compound (I)
12-hydroxystearic acid (16.5 wt %), Hypermer LP1 (15.7 wt %, ex Croda), PEG-50 sorbitol (67.7 wt %) and tin oxalate catalyst (Tegokat 160 ex Goldschmidt) were charged to a glass reactor and heated to 190° C. slowly under nitrogen pressure. The reaction was continued for 12-24 hours then cooled to below 100° C. and the product discharged. This compound was labelled as Compound A and is a liquid with an HLB of 13.5.

Example 3

Preparation of Compound (I)
12-hydroxystearic acid (68.7 wt %), PEG-50 sorbitol (31.3 wt %) and tin oxalate catalyst (Tegokat 160 ex Goldschmidt) were charged to a glass reactor and heated to 190° C. slowly under nitrogen pressure. The reaction was continued for 12-24 hours then cooled to below 100° C. and the product discharged. This compound was labelled as Compound B and is a liquid with an HLB of 6.3.

Example 4

3.2 g of Compound B in Example 3 was mixed with 0.8 g of a coemulsifier (Tween™ 80 available ex Croda) and placed in a 2 oz glass screw cap jar. 40 g of light mineral oil was added and the mixture shaken until homogeneous. 56 g of water was added and the mixture shaken 20 times. An oil in water emulsion was formed which was stable at room temperature for 48 hours.

Example 5

Example 4 was repeated where the emulsifier mixture was replaced by 2.8 g of compound A of Example 2 and 1.2 g of a coemulsifier (Span™ 80 available ex Croda). An oil in water emulsion was formed which was stable at room temperature for 21 days.

What is claimed is:
1. A compound of the formula (I):

$$R^1.[(AO)_n\text{-}AO\text{---}R^2]_m \quad\quad (I)$$

wherein:
R$^1$ is the residue of a group having at least m active hydrogen atoms where m is at least 2;
AO is an alkylene oxide residue;
each n is independently from 0 to 100; and
each R$^2$ is independently H or an acyl group COR$^3$, wherein each R$^3$ is independently a residue of a polyhydroxyalkyl or polyhydroxyalkenyl carboxylic acid, a residue of a hydroxyalkyl or hydroxyalkenyl carboxylic acid and/or a residue of an oligomer of the hydroxyalkyl or hydroxyalkenyl carboxylic acid; wherein the hydroxyalkyl or hydroxyalkenyl carboxylic acid comprises at least 9 carbon atoms; and wherein on average at least 2 of R$^2$ is an acyl group COR$^3$.

2. A compound according to claim 1 wherein R$^1$ is the residue of a group having at least 3 free hydroxyl and/or amino groups.

3. A compound according to claim 1, wherein R$^1$ is the residue of a sugar, preferably a monosaccharide.

4. A compound according to claim 1 having a molecular weight of from 3000 to 8000.

5. A compound according to claim 1 having an HLB from 1.3 to 15.

6. The compound of claim 1, wherein the compound is prepared by a process of manufacture comprising:
i) alkoxylating an R$^1$ group containing m active hydrogen atoms with an alkylene oxide to form an alkoxylated product; and ii) esterifying the alkoxylated product with:
   a) a polyhydroxyalkyl or polyhydroxyalkenyl carboxylic acid; and/or
   b) a hydroxyalkyl or hydroxyalkenyl carboxylic acid.

7. The compound of claim 6, wherein the molar ratio of the alkoxylated product to the polyhydroxyalkyl or polyhydroxyalkenyl carboxylic acid and/or hydroxyalkyl or hydroxyalkenyl carboxylic acid ranges from 1:2 to 1:40.

8. A method of making an emulsion, comprising mixing the compound of claim 1 with a composition comprising water, oil, or a mixture of water and oil.

9. The method of claim 8, wherein the emulsion is a water-in-oil emulsion.

10. The method of claim 8, wherein the emulsion is an oil-in-water emulsion.

11. The method of claim 10, wherein the oil-in-water emulsion is a personal care oil-in-water emulsion.

12. A method of emulsifying an agrochemical or agrochemical formulation, comprising mixing the compound of claim 1 with the agrochemical or agrochemical formulation.

13. A method of emulsifying a polymerization system, comprising mixing the compound of claim 1 with the polymerization system.

14. The method of claim 13, wherein the polymerization system is an emulsion polymerization system or a microemulsion polymerization system.

15. A method of wetting a material, comprising contacting the compound of claim 1 with the material.

16. A method of dispersing a material, comprising mixing the compound of claim 1 with the material.

17. The method of claim 16, wherein the material is an agrochemical.

18. A method of solubilizing a material, comprising mixing the compound of claim 1 with the material.

19. An agrochemical formulation, comprising the compound of claim 1.

* * * * *